United States Patent [19]

Rawlings

[11] Patent Number: 5,041,993
[45] Date of Patent: Aug. 20, 1991

[54] METHOD OF PROCESSING SUB-IMAGES OF AN IMAGE FIELD

[75] Inventor: Keith C. Rawlings, Cheltenham, England

[73] Assignee: Smiths Industries Public Limited Company, London, England

[21] Appl. No.: 474,662

[22] Filed: Feb. 6, 1990

Related U.S. Application Data

[63] Continuation-in-part of Ser. No. 198,793, May 25, 1990, abandoned.

[30] Foreign Application Priority Data

Jun. 12, 1987 [GB] United Kingdom ................ 8713819

[51] Int. Cl.[5] .................... G06F 15/66; G06F 15/70
[52] U.S. Cl. .................................... 364/518; 382/41
[58] Field of Search ............... 364/200, 900, 518, 521; 382/41, 57

[56] References Cited

U.S. PATENT DOCUMENTS

| | | | |
|---|---|---|---|
| 4,174,514 | 11/1979 | Sternberg | 364/200 X |
| 4,380,046 | 4/1983 | Fung | 364/200 |
| 4,395,698 | 7/1983 | Sternberg et al. | 382/41 X |
| 4,395,700 | 7/1983 | McCubbrey et al. | 382/41 X |
| 4,601,055 | 7/1986 | Kent | 364/900 X |
| 4,622,632 | 11/1986 | Tanimoto et al. | 364/200 |

FOREIGN PATENT DOCUMENTS 0257581  3/1988  European Pat. Off. .
8800737  1/1988  PCT Int'l Appl. .
2136996  9/1984  United Kingdom .
2159308  11/1985  United Kingdom .
2177825  1/1987  United Kingdom .

OTHER PUBLICATIONS

IEEE Computer, vol. 16, No. 1, Jan. 1983, Potter, J. L., "Image Processing on the Massively Parallel Processor", pp. 62–67.

IEEE Transactions on Computers, vol. C-31, No. 10, Oct. 1982, Kushner, T., Wu, A. Y., Rosenfeld, A., "Image Processing on ZMOB", pp. 943–951.

"Transputter Systems" by Peter Cavill, Mini Miro Conference Record, San Francisco, California, Nov. 8–11, 1983, pp. 19/15:1–6.

Primary Examiner—Gary V. Harkcom
Assistant Examiner—Michael A. Jaffe
Attorney, Agent, or Firm—Pollock, VandeSande and Priddy

[57] ABSTRACT

An image processing system has sixteen processing assemblies provided by transputers which each have a memory and a processor. An infra-red television camera supplies signals representing different areas of the field of view to respective different ones of the processing assemblies. The assemblies also receive external signals from other sources and are interconnected with one another by a line which enables synchronization between the assemblies. Each processor processes only that information in its memory and provides output signals representative of the respective area of the field of view.

2 Claims, 1 Drawing Sheet

METHOD OF PROCESSING SUB-IMAGES OF AN IMAGE FIELD

This application is a continuation-in-part of Ser. No. 198,793 filed on May 25, 1990, now abandoned.

BACKGROUND OF THE INVENTION

This invention relates to information processing systems and methods.

Information processing systems can be used for many different applications such as voice recognition, image enhancement or other modification, image recognition, image marking or labelling, image storage and so on. Conventionally, the information is stored in a contiguous block of memory (frame store) and a processor receives signals from each element of that memory for use in the image processing. For a typical image input comprising 512 lines each of 512 pixels and a frame rate of 25 frames/second this gives a data input of $512 \times 512 \times 25 = 6,553,600$ bytes/second. This input rate may be too high to be processed in real time by software, requiring software processing in less than real time or the need for additional processing capacity.

Multiple processors could be used, with each processor having access to the frame store. The processing speed, however, will be limited by the shared access to the information in the store since only one processor at a time will be able to have access to the information.

In one prior system described in Fung U.S. Pat. No. 4,380,046 there is described a system in which an image is loaded by sending column elements, or pixels, to each of several processors at one end of an array of processors. After processing these pixels, the edge processors pass on the column data to the next adjacent processor and the edge processors read the next column data. Information is therefore, supplied to all but the edge processors via other processors; in the case of the edge processors, their information is output via other processors. This limits the speed of operation of the system and makes it highly sensitive to failure or fault in any one processor. It also limits the flexibility of the system.

In another prior system described by Potter in IEEE Computer, Vol. 16, No. 1, January 1983, a Single Instruction, Multiple Data (SIMD) architecture is employed where all of several processors obey the same instructions at the same time. It is inherent in the design of this system that data cannot be loaded directly into all the processors but must be passed from processor to processor. Again, this limits the flexibility of the system and imposes geometrical constraints on how the data may be allocated to the processors. The system, in effect, acts like a massively parallel single processor in that it obeys only one program.

BRIEF SUMMARY OF THE INVENTION

It is an object of the present invention to provide improved information processing systems and methods.

According to one aspect of the present invention there is provided an information processing system including a plurality of individual processing assemblies each comprising a respective memory unit and processor means associated with the memory unit, and information input means arranged to supply signals in respect of different parts of the information to respective different ones of the assemblies for storage in the respective memory units, and each processor means being arranged to perform independent processing operations on the contents of its associated memory unit and to provide respective output signals in respect of the different parts of the information to utilization means.

The information may be image information.

According to another aspect of the present invention there is provided an image processing system, including a plurality of individual processing assemblies each comprising a respective memory unit and processor means associated with the memory unit, and information input means arranged to supply image information signals in respect of different ones of a plurality of areas of an image field to respective different ones of the processing assemblies for storage in the respective memory units, and each processor means being arranged to perform independent processing operations on the contents of its associated memory unit so as to provide respective independent output signals in respect of the different areas of the image field to utilization means.

The information may be infra-red image information and may be provided by a television camera. The processing assemblies are preferably interconnected with one another such as to enable synchronization of operation of the processing assemblies. The system may further include means for supplying signals from a sensor to the processing assemblies for storage in the memory units. Each processing assembly may include a respective transputer. Each memory unit may have the same capacity. The utilization means may include display means, the respective output signals from the processing assemblies being supplied to the display means to provide a display representation of the information. The signals in respect of one part of the information may be supplied to a plurality of the processing assemblies so as thereby to increase the processing capacity in respect of one part.

According to a further aspect of the present invention there is provided a method of information processing comprising the steps of supplying input signals in respect of different parts of the information to respective different ones of a plurality of memory units, and performing on the contents of each memory unit independent processing operations to provide respective independent output signals in respect of the different parts of the information to utilization means.

According to yet another aspect of the present invention there is provided a method of image processing comprising the steps of viewing an image field, supplying image signals in respect of different areas of the image field to respective different ones of a plurality of memory units, and performing on the contents of each memory unit independent processing operations so as to provide respective independent output signals in respect of the different areas of the image field.

The output signals are preferably supplied to display means to provide a display representation of the image information.

An image processing system for an aircraft, and its method of operation will now be described, by way of example, with reference to the accompanying drawings.

DESCRIPTION OF PREFERRED EMBODIMENT

Figure 1:
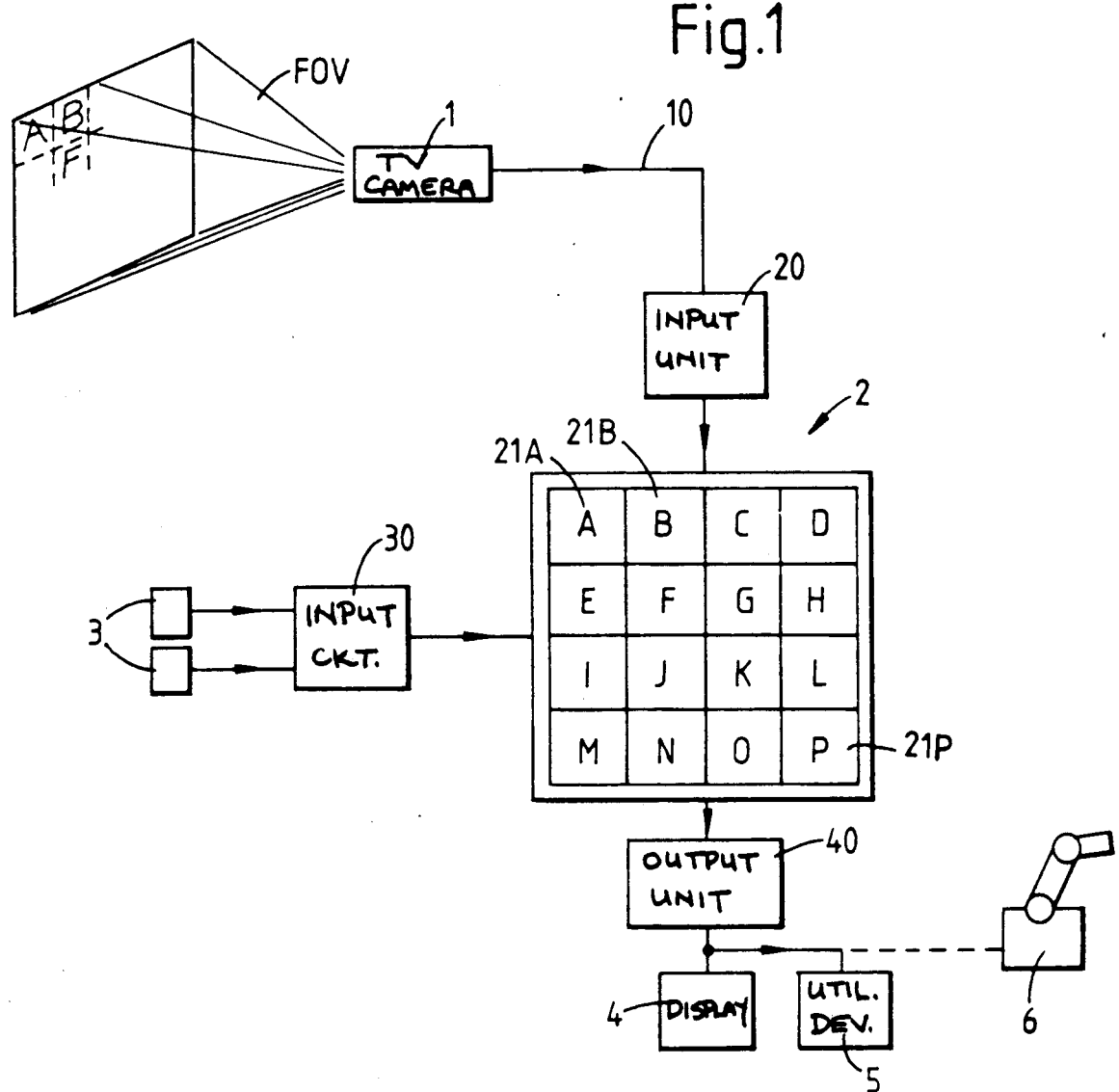
FIG. 1 shows the system schematically.

The processing system includes an infra-red television camera 1 that supplies signals to a processing unit 2 together with signals from other sources 3. The processing unit 2 provides output signals to a display 4 and to other utilization devices 5.

The camera 1 is of a conventional kind and may comprise an array of infra-red detectors on which is focussed the image of the infra-red scene within the field of view (FOV) of the camera. The array of detectors is raster scanned and a video signal in accordance with this is supplied via line 10 to a video input control unit 20 in the processing unit 2. Where the camera has an array of 512 by 512 detectors its output represents 512 pixels along each of 518 lines. The video input control unit 20 functions to divide the field of view into sixteen adjacent areas or sub-images arranged as an array of four-by-four square regions A to P. In the unit 20, the output from the camera 1 is supplied to the appropriate one of sixteen processing assemblies 21A to 21P. The assemblies 21A to 21P may be mounted on four boards, with four assemblies on each board. Each assembly 21 on a board is connected to each of the other three assemblies, with the boards connected in a chain and with the first and last boards connected to the input unit 20 and an output unit 40. Transfer of information from the input control unit 20 to the processing unit 2 is effected by direct memory access to the assemblies 21. In this way, each of the assemblies 21 can be loaded directly and completely independently of others of the assemblies. Also, all the assemblies 21 can be loaded simultaneously with data, in contrast with previous systems where data are transferred from one assembly to the next. This enables great flexibility in how data are allocated between the assemblies 21; it also enables data to be loaded very rapidly into all the assemblies. With a single sub-image memory buffer, each processor can access its respective sub-image for 80% of the time. This can be increased to nearly 100% by using more than one sub-image memory buffer.

Each processing assembly receives signals from an area of the field of view as detected by an array of 128 by 128 of the detectors. The assembly 21A, for example receives signals from the first 128 detectors in each of the top 128 lines, the assembly 21B receives signals from the detectors 129 to 256 in the top 128 lines and so on.

Figure 2:
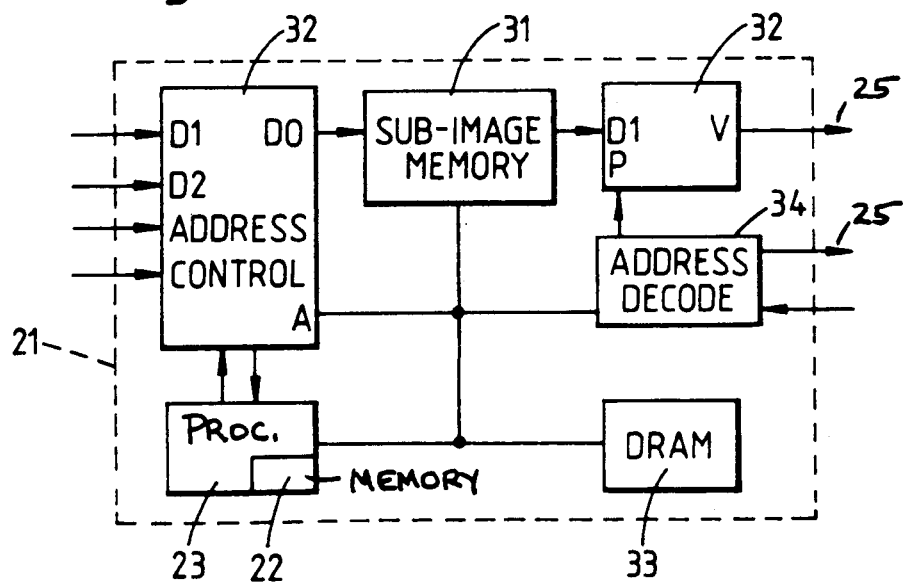
FIG. 2 shows a part of the system in greater detail.

With reference now also to FIG. 2, each assembly 21 includes a transputer, such as an Inmos T414 or T800. The transputer comprises a memory 22 and a processor 23. Within the memory 22 there are sufficient locations to store information in respect of each of the 128 by 128 pixels supplied to the assembly 21 and for use in image processing of the stored information. Each assembly 21 also includes a sub-image memory 31, which may contain one or more buffers for sub-images, and which is connected with a sub-image input/output mapping circuit 32. A program memory 33 is provided by a 256K×32 bit DRAM 33 and interface circuitry 34 for address decode are also shown. The input/output mapping circuit 32 is implemented as a reprogrammable ASIC (application specific integrated circuit) and contains comparators which compare pixel and line count with programmed limits to select the sub-image to be accepted into the assembly 21. Similar circuitry controls the output for dislay of an output image. In addition to the video signals, the assemblies 21 each also receives synchronization signals from the other processing assemblies 21 in the processing unit 2, and external signals from the other sources 3 which may, for example be representative of the camera angle, aircraft attitude, flight characteristics or the like. Signals from the other sources are supplied to the processing unit 2 via an input circuit 30 which distributes information from the sources 3 to appropriate ones of the assemblies 21.

Each assembly 21 has sufficient image memory space to store several sub-images to allow for analysis of time sequences or for the inputs from two or more sensors to be compared. Each assembly 21 is provided with a hard wired address to identify it uniquely within the unit 2 and to allow each assembly to be identified and co-ordinated with the sub-image at the same assembly.

The operations performed by the assemblies 21 are dependent on the requirements and nature of the system, but each transputer processes only that information in its memory, that is, information in respect of that part of the field of view assigned to the processor.

All the assemblies 21 may have identical software which is controlled by a master processor located in the input unit 20 which defines the mapping of the input image to sub-images at specified assemblies 21. The master processor may then send a message to the corresponding assembly 21 instructing it to perform a specified algorithm with parameters defined by the message. Iterative algorithms are used, each frame being processed in the frame time and the results used as the basis for analysis of the next frame. In one example, the camera 1 is responsive to infra-red signals and the transputers are each arranged to identify an infra-red emitting source within their respective regions of the field of view. When an infra-red source is identified above the background infra-red radiation with sufficient certainty, the processor 23 generates a marker against the source which is displaced with movement of the source. The processor 23, from this, and from information from the other sources, calculates the speed of movement of the source, the nature of the source, its size and range, predicts future movement and so on. When the source moves out of the region associated with one assembly 21, the adjacent assembly takes over. In this respect, signals are supplied between the assemblies 21 to prepare them for taking over designation of a source that is moving between them. Each assembly can identify one or more sources within its respective region of the field of view and track them individually. The independent nature of the assemblies 21 means that they may all run the same algorithm on different sub-images, or they may all run different algorithms on the same sub-image, or any combination of these allocations.

Output signals from each assembly 21 are supplied via respective lines 25 and an output unit 40 to the display 4, where an output representation of the or each infra-red source is provided together with its associated marker, information legends, track representations, and so on. The output from each transputer 21 is directly supplied to the output unit 40, without the need to load successively from one transputer to other transputers. In this way, high-speed, real-time operation is possible. A degree of redundancy is also achieved because a fault or failure in one transputer need not compromise the output of the other transputers.

It will be appreciated that it is not essential for a display to be provided. Instead, the output signals could be supplied solely to the utilization means 5 such as to control weapon aiming equipment or the like.

By contrast with conventional block stores which typically require a total data input of:

$$512 \times 512 \text{ (bytes)} \times 25 \text{ (frames/s)} = 6,553,600 \text{ bytes/s}$$

the arrangement of the present invention requires for each unit:

$$128 \times 128 \text{ (bytes)} \times 25 \text{(frames/s)} = 409{,}600 \text{ bytes/s}.$$

Because each processor has access only to a respective part of the memory it can have continuous access to this part of the memory. This is in contrast with other arrangements involving the same number of processors and the same size of memory, but in which each processor has access to the entire memory. In such arrangements, each processor has to share access to the memory with other processors so that, for n processors each can only have access to the memory for a fraction 1/n of the time. Where sixteen processors are used this would only enable each to have access to the frame store for 6% of the time, thereby substantially reducing overall processing speed.

Various modifications can be made to the system described above, such as by using a greater or fewer number of processing assemblies.

The system could be used for processing other forms of information such as image information derived from an infra red detector, or sound information for use in voice recognition. The system could be used in robotic apparatus with the output signals from the system being used to control positioning or manipulation apparatus indicated by the numeral 6. Other sources of video input signal could be used to provide video image information such as, for example, provided by a video signal recorder or radar apparatus.

It will be appreciated that the size of memory 22 associated with each sub-image need not be identical. For example, where increased processing is required, more than one processor assembly 21 could be used to store and process information from the same sub-image. The size and location of the memory associated with each sub-image could also be dynamically determined in accordance with the nature of the information, that is, the size and location would be variable in accordance with the nature of the information at any time. For example, if an object was identified in a region of the field-of-view, and its nature was determined as being moving, information in respect of that region could be supplied to a greater number of processor assemblies, with information from other regions being supplied to fewer processor assemblies, so that increased processing could be performed on the region including the moving object.

What I claim is:

1. A method of image processing comprising the steps of: viewing an image field; dividing the image field into a plurality of sub-images; determining in real time an amount of processing memory required for each sub-image; supplying image information in respect of different sub-images directly to respective different ones of a plurality of memory units in respective processing assemblies independently of others of the assemblies, those sub-images requiring increased processing memory being supplied to a greater number of processing assemblies than the processing assemblies that are supplied with others of the sub-images requiring lesser processing memory; causing said processing assemblies to perform independent processing operations on information in each said memory unit; and providing respective independent output signals in respect of the different sub-images of the image field directly to utilization means independently of others of the assemblies.

2. A method according to claim 1, including the step of supplying said output signals to display means to provide a display representation of the image information.

* * * * *